(12) United States Patent
Sadano et al.

(10) Patent No.: US 11,458,857 B2
(45) Date of Patent: Oct. 4, 2022

(54) POWER TRANSFER MANAGING APPARATUS, AND COMPUTER-READABLE STORAGE MEDIUM

(71) Applicant: HONDA MOTOR CO., LTD., Tokyo (JP)

(72) Inventors: Hakaru Sadano, Saitama (JP); Motoki Hishida, Saitama (JP); Hiroyuki Kanazawa, Saitama (JP)

(73) Assignee: HONDA MOTOR CO., LTD., Tokyo (JP)

( * ) Notice: Subject to any disclaimer, the term of this patent is extended or adjusted under 35 U.S.C. 154(b) by 292 days.

(21) Appl. No.: 16/726,792

(22) Filed: Dec. 24, 2019

(65) Prior Publication Data

US 2020/0231056 A1 Jul. 23, 2020

(30) Foreign Application Priority Data

Jan. 17, 2019 (JP) .............................. JP2019-005992

(51) Int. Cl.
| | |
|---|---|
| B60L 53/62 | (2019.01) |
| H02J 3/32 | (2006.01) |
| H02J 13/00 | (2006.01) |
| B60L 50/64 | (2019.01) |
| B60L 58/24 | (2019.01) |
| B60L 53/18 | (2019.01) |

(Continued)

(52) U.S. Cl.
CPC .............. B60L 53/62 (2019.02); B60L 50/64 (2019.02); B60L 58/24 (2019.02); H02J 3/322 (2020.01); H02J 13/00006 (2020.01); *B60L 53/18* (2019.02); *B60L 53/67* (2019.02); *B60L 53/68* (2019.02); *B60L 2250/00* (2013.01)

(58) Field of Classification Search
None
See application file for complete search history.

(56) References Cited

U.S. PATENT DOCUMENTS

| 10,464,434 B2 | 11/2019 | Homma |
| 10,833,375 B2 | 11/2020 | Ikeno |

(Continued)

FOREIGN PATENT DOCUMENTS

| JP | 2012075306 A | 4/2012 |
| JP | 5606406 B2 | 10/2014 |

(Continued)

OTHER PUBLICATIONS

Office Action issued for counterpart Japanese Application No. 2019-005992, issued by the Japan Patent Office dated Sep. 23, 2020 (drafted on Sep. 14, 2020).

*Primary Examiner* — Jared Fureman
*Assistant Examiner* — Joel Barnett

(57) ABSTRACT

A power transfer managing apparatus includes: a demand information acquiring unit that acquires information indicating power demand in a power network; a selecting unit that selects, as a vehicle to be caused to perform power transfer with the power network according to the power demand, a vehicle provided with a driving power source having an accumulated energy amount larger than a predetermined accumulation amount, and having an accumulatable energy amount larger than a predetermined accumulatable amount; and a notification control unit that makes a user of the vehicle that is selected by the selecting unit notified.

13 Claims, 13 Drawing Sheets

(51) Int. Cl.
*B60L 53/67* (2019.01)
*B60L 53/68* (2019.01)

(56) References Cited

U.S. PATENT DOCUMENTS

| | | | |
|---|---|---|---|
| 2012/0053742 A1* | 3/2012 | Tsuda | B60L 53/63 |
| | | | 700/291 |
| 2015/0372354 A1* | 12/2015 | Nakano | H01M 10/482 |
| | | | 429/90 |
| 2016/0052413 A1* | 2/2016 | Shimizu | H04W 4/029 |
| | | | 700/291 |
| 2017/0136911 A1* | 5/2017 | Ricci | G01C 21/3469 |
| 2017/0223807 A1* | 8/2017 | Recker | H02J 13/00006 |
| 2020/0006954 A1 | 1/2020 | Miyata | |
| 2020/0313439 A1 | 10/2020 | Kakuda | |

FOREIGN PATENT DOCUMENTS

| | | |
|---|---|---|
| JP | 2015100203 A | 5/2015 |
| JP | 2018023270 A | 2/2018 |
| JP | 6321763 B1 | 5/2018 |
| JP | 2018148679 A | 9/2018 |
| WO | 2017204011 A1 | 11/2017 |

* cited by examiner

| VEHICLE ID | TIME | BATTERY SOC | BATTERY TEMPERATURE | VEHICLE POSITION | VEHICLE STATE |
|---|---|---|---|---|---|
| V100 | t1 | SOC1 | T1 | P1 | STOPPED |
| V100 | t2 | SOC2 | T2 | P2 | STARTED TRAVELLING |
| V100 | t3 | SOC3 | T3 | P3 | TRAVELLING |
| V100 | t4 | SOC4 | T4 | P4 | STOPPED |
| V100 | t5 | SOC5 | T5 | P5 | STARTED CHARGING |
| ⋮ | ⋮ | ⋮ | ⋮ | ⋮ | ⋮ |

*FIG. 7*

| USER ID | CURRENT POINTS | ACCUMULATIVE POINTS |
|---|---|---|
| U100 | 1500 | 12000 |
| U101 | 750 | 8000 |
| ... | ... | ... |

*FIG. 12*

POWER TRANSFER MANAGING APPARATUS, AND COMPUTER-READABLE STORAGE MEDIUM

The contents of the following Japanese patent application are incorporated herein by reference: 2019-005992 filed on Jan. 17, 2019.

BACKGROUND

1. Technical Field

The present invention relates to a power transfer managing apparatus, and a computer-readable storage medium.

2. Related Art

For power transactions at the time of charge/discharge of electric vehicles, there are known apparatuses that manage energy transactions by defining accumulation amount-by-accumulation amount price ranges as transaction price ranges for energy at each energy accumulation amount level (see Patent Literature 1 explained below, etc., for example).

PRIOR ART LITERATURES

Patent Literatures

[Patent Literature 1] Japanese Patent No. 5606406
[Patent Literature 2] Japanese Patent No. 6321763

SUMMARY

Voltage variations, and frequency variations can occur due to the gap between power supply and demand in a power network. Since in a system that provides at least partial balancing power to cope with the power supply/demand gap by means of vehicles' driving power source, vehicles with driving power sources in which small amounts of energy can be accumulated cannot provide sufficient balancing power, vehicles with driving power sources in which large amounts of energy can be accumulated are also connected to a power network in some cases. Because of this, a large number of vehicles need to be connected to the power network in order to cope with power demand.

BRIEF DESCRIPTION OF THE DRAWINGS

FIG. 7 illustrates, in a table format, one example of history information stored in a history storage unit 284.

FIG. 12 illustrates, in a table format, one example of consideration information stored in a consideration information storage unit 282.

DESCRIPTION OF EXEMPLARY EMBODIMENTS

Hereinafter, (some) embodiment(s) of the present invention will be described. The embodiment(s) do(es) not limit the invention according to the claims, and all the combinations of the features described in the embodiment(s) are not necessarily essential to means provided by aspects of the invention. Note that the identical or similar portions in drawings are given the same reference numbers, and repetitive explanations are omitted in some cases.

Figure 1:
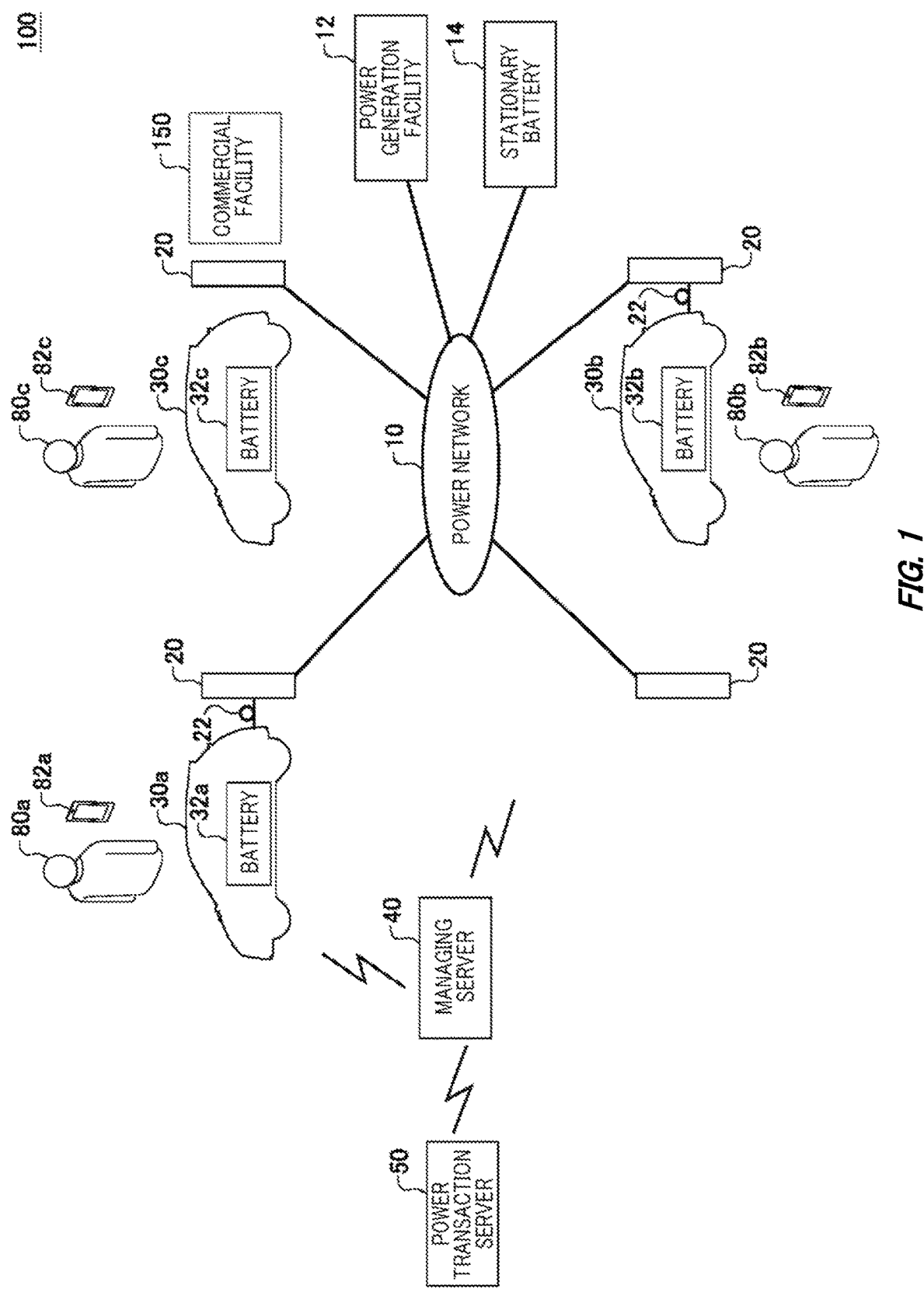
FIG. 1 schematically illustrates the basic configuration of a power transfer system 100.

FIG. 1 schematically illustrates the basic configuration of a power transfer system 100. The power transfer system 100 is a system for a power aggregator, for example, to perform V2G (Vehicle-to-Grid) for exchange of power between vehicles and a power network by using batteries provided to the vehicles. The power transfer system 100 has a function of facilitation connection of a vehicle provided with a battery having an appropriate remaining capacity for power demand to a power network. Note that, in V2G, at least either release of power by a vehicle to the power network or reception of power by a vehicle from the power network is performed.

The power transfer system 100 includes: a plurality of vehicles including a vehicle 30a, a vehicle 30b, and a vehicle 30c; a stationary battery 14; a plurality of charge/discharge facilities 20; a managing server 40; a power generation facility 12; and a plurality of user terminals including a user terminal 82a, a user terminal 82b, and a user terminal 82c.

A user 80a is a user of the vehicle 30a, a user 80b is a user of the vehicle 30b, and a user 80c is a user of the vehicle 30c. Note that a user of a vehicle may be any person who uses the vehicle such as an owner of the vehicle or a family member of the owner. In the present embodiment, the user 80a, user 80b, and user 80c are generally called a "user 80" in some cases.

The vehicle 30a includes a battery 32a. The vehicle 30b includes a battery 32b. The vehicle 30c includes a battery 32c. In the present embodiment, the plurality of vehicles including the vehicle 30a, vehicle 30b, and vehicle 30c are generally called a "vehicle 30" in some cases. In addition, a plurality of batteries including the battery 32a, battery 32b, and battery 32c are generally called a "battery 32" in some cases. The battery 32 may be any of various secondary batteries such as lithium ion batteries or nickel hydrogen batteries.

Note that the battery 32 is one example of a driving power source provided to the vehicle 30. The driving power source includes a power source that, like a fuel cell or the like, consumes a fuel to generate electric energy to be provided to a motive power source of the vehicle 30. The fuel may be hydrogen, a hydrocarbon fuel such as gasoline, light oil or natural gas, an alcohol fuel, or the like. The driving power source may be any power source that can generate electric energy to be provided to a motive power source of the vehicle 30.

The vehicle 30 is one example of a transportation device. The vehicle 30 is a vehicle including a motive power source to be driven by electric energy, such as an electric vehicle or a fuel cell vehicle (FCV), for example. Electric vehicles include a battery electric vehicle (BEV), a hybrid vehicle or plug-in hybrid electric vehicle (PHEV) including an internal combustion engine to provide at least part of motive power. In the present embodiment, the vehicle 30 is an electric vehicle including the battery 32 as a driving power source. In the form employing a battery as a driving power source, battery discharge corresponds to energy release from the driving power source, and battery charge corresponds to energy accumulation in the driving power source. In addition, the battery remaining capacity corresponds to an amount of energy accumulated in the driving power source such as an amount of power or amount of electricity that can be supplied from the driving power source. In addition, the battery rechargeable capacity corresponds to an amount of energy that can be accumulated further in the driving power source such as an amount of power or amount of electricity that can be accumulated further in the driving power source.

The user terminal 82a is a communication terminal used by the user 80a. The user terminal 82b is a communication terminal used by the user 80b. The user terminal 82c is a communication terminal used by the user 80c. The plurality of user terminals including the user terminal 82a, user terminal 82b, and user terminal 82c are generally called a "user terminal 82" in some cases.

The user terminal 82 may be a mobile terminal, a personal computer, a vehicle navigation device, or the like, for example. Examples of the mobile terminal include a mobile phone, a smartphone, a PDA, a tablet, a notebook computer, a laptop computer, a wearable computer, and the like.

The managing server 40 is capable of communication with the vehicle 30, stationary battery 14, and user terminal 82 through a communication network. The managing server 40 is also capable of communication with a power transaction server 50 through a communication network. The communication networks may include wired communication or wireless communication transmission paths. The communication networks may include communication networks including the Internet, a P2P network, a dedicated line, a VPN, a power line communication line, a mobile phone line, and the like.

A power network 10 may include a power transmission system or a power distribution system of a power system, or a power distribution network of a power grid. The power network 10 may be provided for each region. The power network 10 may be a micro grid. The power network 10 may be a power distribution network of any scale that connects power devices that consume power, and power sources. For example, the power network 10 may be a power distribution network provided to any of facilities such as a commercial facility 150. The power network 10 may be provided for each building. The vehicle 30, stationary battery 14, charge/discharge facility 20, and power generation facility 12 are connected to the power network 10. The charge/discharge facility 20, stationary battery 14, and power generation facility 12 are capable of power transfer with the power network 10. Note that the charge/discharge facility 20 is one example of power transfer facilities for performing power transfer between the vehicle 30 and the power network 10. Note that the charge/discharge facility 20, and stationary battery 14 are each one example of electric facilities for accumulating energy in the driving power source provided to the vehicle 30.

The power generation facility 12 is managed by an electric power company or the like. Charge/discharge facilities 20 include, for example, a charger/discharger installed at a residence, a charge/discharge station installed at a parking lot or public space of a multi-dwelling unit, a building or the commercial facility 150, and the like.

The vehicle 30 is connected to the charge/discharge facility 20 through a charge/discharge cable 22. That is, the vehicle 30 is connected to the power network 10 through the charge/discharge cable 22, and charge/discharge facility 20. The vehicle 30 performs power transfer between the battery 32 and the power network 10 through the charge/discharge facility 20. For example, the vehicle 30 releases power obtained by discharge of the battery 32 to the power network 10 via the charge/discharge cable 22, and charge/discharge facility 20. In addition, the vehicle 30 charges the battery 32 with power supplied from the power network 10 via the charge/discharge cable 22, and charge/discharge facility 20. Note that transfer of power between an entity and a power network 10 is called "power transfer with the power network 10" and the like in some cases.

The stationary battery 14 is managed by the power aggregator. The battery 32 of the vehicle 30 forms a virtual power plant along with the stationary battery 14. The managing server 40 is managed by the power aggregator. The managing server 40 controls power transfer between the battery 32 and the power network 10, and between the stationary battery 14 and the power network 10.

The managing server 40 performs power transaction by bidding in a wholesale power market. The power transaction server 50 is managed by an operator of the wholesale power market. The length of each time segment is defined as 30 minutes, and the managing server 40 places a bid in the power transaction server 50 in every time segment. The managing server 40 causes the battery 32, and stationary battery 14 to discharge power in each time segment based on a contract result to supply the power to the power network 10.

For example, the managing server 40 causes the battery 32, and stationary battery 14 to discharge power according to a contract amount which is a result of bidding in the wholesale power market by the power aggregator to supply the power network 10 with the power released from the battery 32, and stationary battery 14. In addition, the managing server 40 controls charge/discharge of the battery 32, and stationary battery 14 to balance power supply and demand in the power network 10 to an extent of the balancing power agreed in a transaction which is a result of bidding in the supply/demand balancing market by the power aggregator. For example, the managing server 40 controls charge/discharge of the battery 32, and stationary battery 14 according to an increased-demand response (increased-DR), a decreased-demand response (decreased-DR), and a increased/decreased-demand response (increased/decreased-DR) requested by a power transmission/distribution company or a retail electricity supplier.

Specifically, the managing server 40 controls at least one of the vehicle 30 and the charge/discharge facility 20 according to a increased-DR to thereby charge the battery 32 of the vehicle 30 with power received from the power network 10 through the charge/discharge facility 20. In addition, the managing server 40 controls at least one of the vehicle 30 and the charge/discharge facility 20 according to a decreased-DR to thereby cause the battery 32 of the vehicle 30 to discharge power, and cause the power obtained by the discharge of the battery 32 to be released toward the power network 10 through the charge/discharge facility 20.

In the present embodiment, the managing server 40 prompts the user 80 of the vehicle 30 having a remaining capacity, and rechargeable capacity of the battery 32 which are larger than predetermined capacity values, respectively, to connect the vehicle 30 to the power network 10. The vehicle 30 having a large remaining capacity, and rechargeable capacity of the battery 32 not only can supply power to the power network 10 if there is a shortage in power supply of the power generation facility 12 relative to power demand, for example, but also can absorb an excess of power if there is an excess of power supply of the power generation facility 12 relative to power demand. Because of this, it is possible to cope with both the situation where power demand is high in the power network 10 and the situation where power demand is low in the power network 10, with a smaller number of vehicles 30. Because of this, it is possible to reduce the number of vehicles 30 that the power aggregator is required to manage in order to keep a capacity that is available for power transfer between the vehicle 30 and the power network 10.

Note that, in the present embodiment, power transfer means that power exchange from at least one of the vehicle 30 and the power network 10 to the other occurs. For example, power transfer may mean that power release is performed from the vehicle 30 toward the power network 10. In addition, power transfer may mean that power transmission is performed from the power network 10 toward the vehicle 30. Note that if the vehicle 30 releases power through a charger/discharger installed at a power consumer such as a home, net power supply to the power network 10 does not occur at a connection point between the power consumer's side and the power network 10 when the power consumption on the power consumer's side is greater than the power released from the vehicle 30, and the amount of power supply from the connection point to the power consumer simply decreases in some cases. In this case also, it can be considered that power exchange has occurred with the outside of the power network 10 from the perspective of the power network 10. Accordingly, it does not matter in the present embodiment whether or not the power network 10 receives net power from a particular connection point between the power network 10 and the vehicle 30 in power transfer with the power network 10 in which the vehicle 30 releases power.

Figure 2:
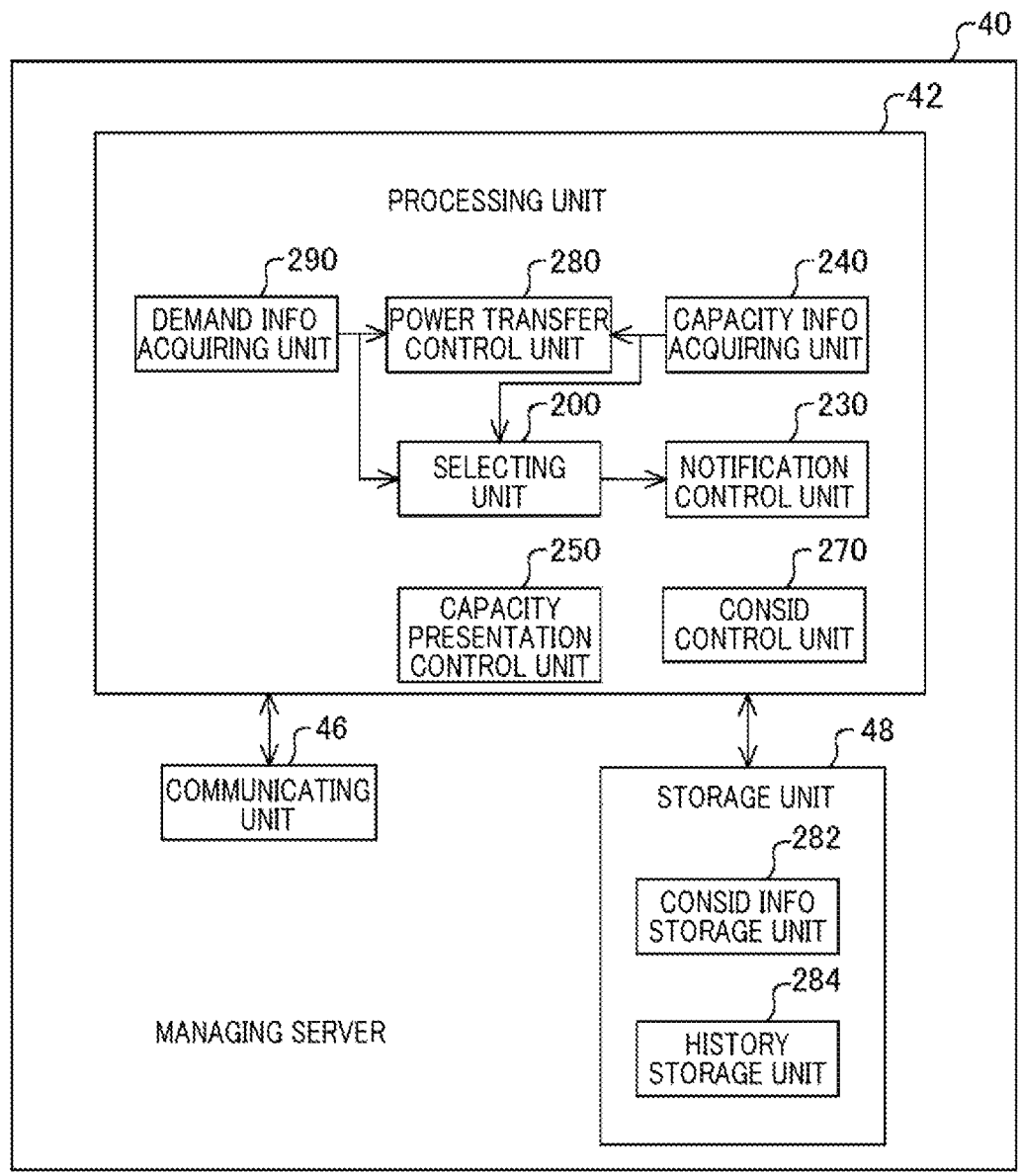
FIG. 2 schematically illustrates the functional configuration of a managing server 40.

FIG. 2 schematically illustrates the functional configuration of the managing server 40. The managing server 40 includes a processing unit 42, a storage unit 48, and a communicating unit 46.

The processing unit 42 is realized by a processing device including a processor. The storage unit 48 is realized by a nonvolatile storage device. The processing unit 42 performs processes by using information stored in the storage unit 48. The communicating unit 46 is responsible for communication with the vehicle 30, stationary battery 14, user terminal 82, and power transaction server 50. Information received by the communicating unit 46 from the vehicle 30, stationary battery 14, user terminal 82, and power transaction server 50 is supplied to the processing unit 42. In addition, information to be sent to the vehicle 30, stationary battery 14, user terminal 82, and power transaction server 50 is generated by the processing unit 42, and sent via the communicating unit 46.

The managing server 40 functions as a power transfer managing apparatus. The managing server 40 may be a system realized by one information processing device, or may be a system realized by a plurality of information processing devices.

The processing unit 42 includes a selecting unit 200, a notification control unit 230, a capacity information acquiring unit 240, a capacity presentation control unit 250, a consideration control unit 270, a power transfer control unit 280, and a demand information acquiring unit 290.

The storage unit 48 includes a consideration information storage unit 282, and a history storage unit 284. The consideration information storage unit 282 stores consideration information indicating a consideration provided to the user 80. The history storage unit 284 stores history information including a travel history of the vehicle 30.

The demand information acquiring unit 290 acquires information indicating power demand in the power network 10. According to the power demand, the selecting unit 200 selects, as the vehicle 30 to be caused to perform power transfer with the power network 10, a vehicle 30 provided with a battery 32 having a remaining capacity larger than a predetermined remaining capacity value, and having a rechargeable capacity larger than a predetermined rechargeable capacity value. As described below, the selecting unit 200 may select, as the vehicle 30 to be caused to perform power transfer with the power network 10, a vehicle 30 provided with a battery 32 having a remaining capacity larger than a predetermined remaining capacity value $41$, and having a rechargeable capacity larger than a predetermined rechargeable capacity value $\Delta 2$.

The notification control unit 230 makes the user 80 of the vehicle 30 that is selected by the selecting unit 200 notified. For example, the notification control unit 230 sends information for notification to the user 80 through the communicating unit 46 to cause the user terminal 82 to perform notification to the user 80.

The information indicating the power demand may be information indicating demand for balancing power in the power network 10. If demand for balancing power is higher than a predetermined value, the selecting unit 200 may prioritize selection, as the vehicle 30 to be caused to perform power transfer with the power network 10, of a vehicle 30 provided with a battery 32 having a remaining capacity larger than a predetermined remaining capacity value, and having a rechargeable capacity larger than a predetermined rechargeable capacity value over selection of other vehicles 30.

The notification control unit 230 may make the user 80 of the vehicle 30 that is selected by the selecting unit 200 notified of a consideration for the fact the vehicle 30 is made available for power transfer with the power network 10. In addition, if the vehicle 30 selected by the selecting unit 200 was available for power transfer with the power network 10, the consideration control unit 270 associates, with the user 80 of the vehicle 30, consideration information indicating a consideration for the fact that the vehicle 30 was available for power transfer with the power network 10. For example, the consideration control unit 270 may store, in the consideration information storage unit 282, the consideration information associated with the user 80. Note that, in the present embodiment, that the vehicle 30 is connected to the charge/discharge facility 20 is one example of that "the vehicle 30 is made available for power transfer with the power network 10".

According to the power demand, the selecting unit 200 selects, as the vehicle 30 to be caused to perform power transfer with the power network 10, a vehicle 30 provided with a battery 32 having an accumulated energy amount larger than a predetermined accumulation amount, and having an accumulatable energy amount larger than a predetermined accumulatable amount. For example, according to the power demand, the selecting unit 200 may select, as the vehicle 30 to be caused to perform power transfer with the power network 10, a vehicle 30 provided with a battery 32 having a remaining capacity larger than a predetermined remaining capacity value, having a rechargeable capacity larger than a predetermined rechargeable capacity value, and a battery-32 temperature which is within a predetermined range.

According to the power demand, the selecting unit 200 may select, as the vehicle 30 to be caused to perform power transfer with the power network 10, a vehicle 30 provided with a battery 32 having a remaining capacity larger than a predetermined remaining capacity value, having a rechargeable capacity larger than a predetermined rechargeable capacity value, and a battery-32 temperature which is within a predetermined range that is determined based on the remaining capacity of the battery 32.

According to the power demand, the power transfer control unit 280 causes the vehicle 30 that is available for power transfer with the power network 10 to perform power transfer with the power network 10. For example, the power transfer control unit 280 communicates with the ECU of the vehicle 30 to successively acquire power transferability information indicating whether or not the vehicle 30 is connected to a charge/discharge facility 20 available for power transfer with the power network 10. If the vehicle 30 is available for power transfer with the power network 10, the power transfer control unit 280 instructs the ECU provided to the vehicle 30 to perform charge/discharge of the battery 32 according to power demand indicated by information acquired by the demand information acquiring unit 290. The ECU of the vehicle 30 communicates with the charge/discharge facility 20 according to the instruction of the power transfer control unit 280, and controls a power converter of the vehicle 30 to perform charge of the battery 32 through the charge/discharge facility 20 or release of power obtained through discharge of the battery 32. Note that the power transfer control unit 280 may successively acquire, from the ECU of the vehicle 30, information indicating: an amount of power input from the charge/discharge facility 20 to the power converter at the time of charge of the battery 32; an amount of power output from the power converter to the charge/discharge facility 20 at the time of discharge of the battery 32; and the SOC (State of Charge) of the battery 32. The power transfer control unit 280 may control power transfer between the vehicle 30 and the power network 10 based on the information acquired from the ECU of the vehicle 30.

Note that the contract amount in power transaction mentioned above is one example of the information indicating the power demand. The information indicating the power demand may be a contract price in power transaction or a contract type indicating whether a transaction is a buy contract or a sell contract. In addition, the information indicating the power demand may be information indicating an amount of real-time imbalance between supply and demand in the power network 10 or may be information indicating a predicted value of an amount of future imbalance between supply and demand. The information indicating the power demand may be information indicating a real-time power consumption amount of the power consumer in the power network 10 or a predicted value of the power consumption. Information that can be applied to the information indicating the power demand is not limited to power amounts themselves, but include various types of information that directly or indirectly affects power demand such as temperature information, humidity information, weather information, or event information. Note that examples of the power transaction market include transaction markets such as a day-ahead market, an intraday market, and a supply/demand balancing power market. Forms that can be applied as the transaction form of power transaction include various transaction forms other than the transaction forms in these power transaction markets.

The capacity information acquiring unit 240 acquires, from the user 80 of the vehicle 30, information indicating a value of minimum capacity that should be kept in the battery 32 provided to the vehicle 30. For example, the capacity information acquiring unit 240 acquires, through the user terminal 82, and communicating unit 46, information indicating an amount of a minimum capacity value input to the user terminal 82.

The power transfer control unit 280 may cause power transfer to be performed with the power network 10 such that the remaining capacity of the battery 32 does not fall below the minimum capacity value. The selecting unit 200 may select, as the vehicle 30 to be caused to perform power transfer with the power network 10, a vehicle 30 provided with a battery 32 having a remaining capacity larger than the sum of a predetermined remaining capacity value and the minimum capacity value, and having a rechargeable capacity larger than a predetermined rechargeable capacity value. For example, as described below, the selecting unit 200 may select, as the vehicle 30 to be caused to perform power transfer with the power network 10, a vehicle 30 provided with a battery 32 having a remaining capacity larger than the sum of the predetermined remaining capacity value $\Delta 1$ and the minimum capacity value Cmin, and having a rechargeable capacity larger than the predetermined rechargeable capacity value $\Delta 2$.

The capacity presentation control unit 250 causes information indicating a recommended value of the minimum capacity to be presented to the user 80 based on a travel history of the vehicle 30. For example, the capacity presentation control unit 250 calculates a recommended value of the minimum capacity value based on travel history information stored in the history storage unit 284. The capacity presentation control unit 250 sends, to the user terminal 82 through the communicating unit 46, information indicating the calculated recommended value of the minimum capacity value to cause the user terminal 82 to present the recommended value of the minimum capacity value to the user 80. Note that the consideration control unit 270 increases a consideration in information associated with the user 80, as the minimum capacity value acquired from the user 80 decreases.

With the managing server 40, it is possible to facilitate connection of a vehicle having a battery remaining capacity, and rechargeable capacity that is capable of coping with variations in power demand to the power network 10. Because of this, the power aggregator can reduce the number of vehicles 30 that need to be managed for keeping a power transfer capacity for power transfer with the power network 10. This eventually contributes to stabilization of the power network 10.

Note that functions of the power transfer managing apparatus may be realized singly by the managing server 40 or may be realized by a combination of the managing server 40 and the ECU of the vehicle 30. For example, at least some of processes executed by the managing server 40 may be executed by the ECU of the vehicle 30. For example, at least some of the functions realized by the selecting unit 200, notification control unit 230, capacity information acquiring unit 240, capacity presentation control unit 250, consideration control unit 270, power transfer control unit 280, demand information acquiring unit 290, consideration information storage unit 282, and history storage unit 284 may be realized by the ECU of the vehicle 30.

Figure 3:
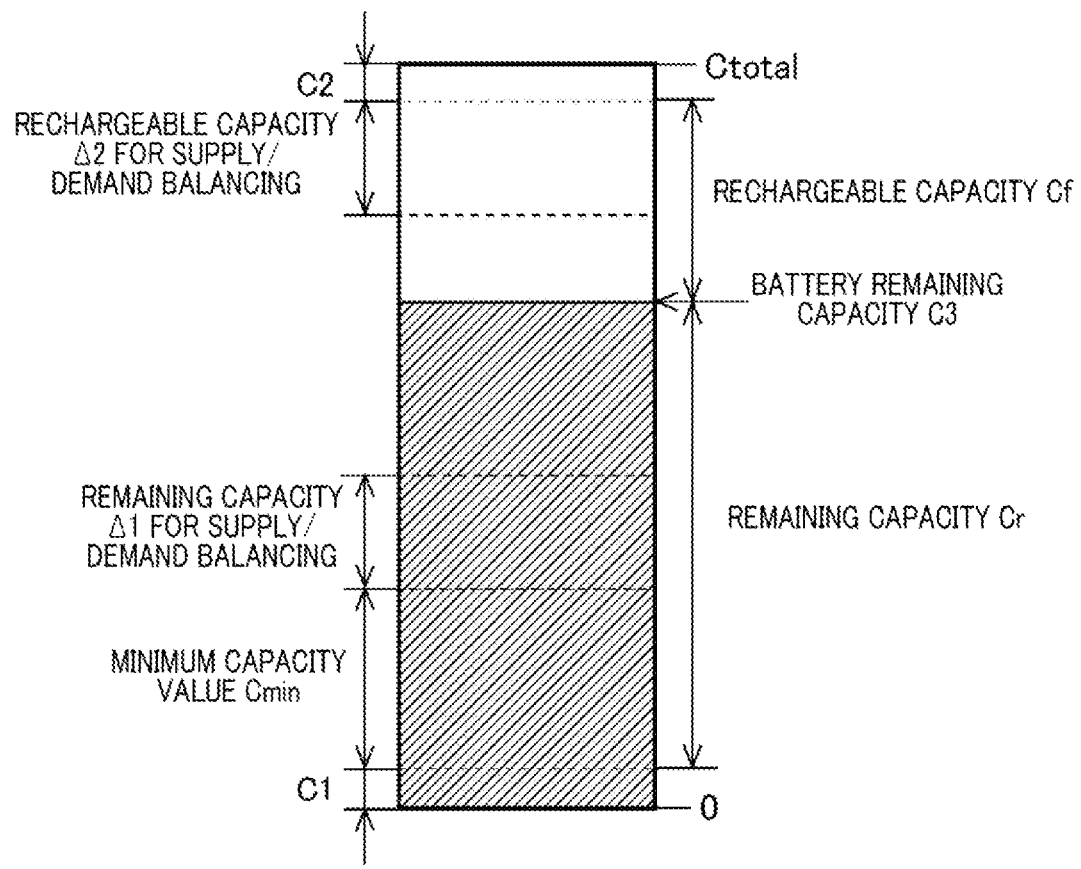
FIG. 3 is a schematic diagram for explaining the remaining capacity, and rechargeable capacity of a battery 32.

FIG. 3 is a schematic diagram for explaining the remaining capacity, and rechargeable capacity of the battery 32. In FIG. 3, Ctotal indicates the overall capacity of the battery 32. For example, Ctotal may be the capacity of the battery 32 when it is fully charged.

C1 indicates the capacity that should be kept in the battery 32 at a minimum. The ECU of the vehicle 30 controls discharge of the battery 32 such that the SOC of the battery 32 will not fall below the SOC corresponding to C1. C2 indicates the capacity of the battery 32 which is prohibited from being charged. The ECU of the vehicle 30 controls charge of the battery 32 such that the SOC of the battery 32 will not exceed the SOC corresponding to Ctotal−C2 in order to prevent overcharge of the battery 32, for example. For example, if both C1 and C2 are 5% of Ctotal, the ECU of the vehicle 30 controls charge/discharge of the battery 32 such that the SOC of the battery 32 stays in the range of 5% to 95%.

Cmin indicates the value of the minimum capacity that is specified by the user 80, and should be kept in the battery 32. If the power transfer control unit 280 of the managing server 40 causes the battery 32 to discharge power, the battery 32 discharges power such that the SOC of the battery 32 will not fall below the SOC corresponding to C1+Cmin. If the power transfer control unit 280 causes power transfer to be performed between the vehicle 30 and the power network 10, the power transfer control unit 280 controls charge/discharge of the battery 32 such that the SOC of the battery 32 stays in the range of the SOC corresponding to C1+Cmin to Ctotal−C2. Thereby, the user 80 can use at least the cell capacity corresponding to Cmin for the vehicle 30.

C3 indicates the current remaining capacity of the battery 32. Cr indicates the remaining capacity available in the battery 32. Specifically, the remaining capacity Cr is C3−C1. The remaining capacity Cr does not include C1. That is, Cr is a capacity that is permitted to be discharged from the battery 32. In addition, Cf indicates the rechargeable capacity available at the battery 32. Specifically, the rechargeable capacity Cf is Ctotal−C2. The capacity Cf does not include C2. That is, Cf is a capacity that is permitted to be charged in the battery 32.

In FIG. 3, $\Delta 1$ indicates a remaining capacity value that is desired for supply/demand balancing. $\Delta 2$ indicates the value of a rechargeable amount desired for supply/demand balancing. The selecting unit 200 of the managing server 40 selects, as the vehicle 30 to be caused to perform power transfer with the power network 10, a vehicle 30 having a remaining capacity Cr which exceeds at least the remaining capacity value $\Delta 1$, and having a rechargeable capacity which exceeds at least the rechargeable capacity value $\Delta 2$. Note that $\Delta 1$ and $\Delta 2$ may be the same value or may be different values.

Note that if Cmin is determined by the user 80 as illustrated in FIG. 3, the selecting unit 200 selects, as the vehicle 30 to be caused to power transfer with the power network 10, a vehicle 30 having a remaining capacity Cr which exceeds at least Cmin+$\Delta 1$, and having a rechargeable capacity which exceeds at least $\Delta 2$. A vehicle 30 having a remaining capacity Cr exceeding Cmin+$\Delta 1$, and having a rechargeable capacity Cf exceeding $\Delta 2$ is selected. Based at least on the remaining capacity Cr, and rechargeable capacity Cf, the consideration control unit 270 calculates a consideration to be given to the user 80 if the selected vehicle 30 was connected to the charge/discharge facility 20.

For example, if the vehicle 30 was connected to the charge/discharge facility 20, a basic consideration is given irrespective of Cr, and Cf of the battery 32. The user 80 of the vehicle 30 provided with the battery 32 having a remaining capacity Cr exceeding Cmin+$\Delta 1$, and having a rechargeable capacity Cf exceeding $\Delta 2$ is given a bonus consideration in addition to the basic consideration.

The bonus consideration is calculated for example by multiplying the smaller capacity value of Cr−Cmin and Cf with a coefficient K0 and a coefficient KT. The coefficient K0 is a conversion coefficient for converting the capacity value into points as a consideration to be given to the user 80. The coefficient KT is a coefficient which is dependent on the temperature of the battery 32, and is equal to or larger than 0. The coefficient KT is described below.

The consideration control unit 270 associates information indicating the bonus consideration with the user 80 of the vehicle 30 selected by the selecting unit 200. In addition, the consideration control unit 270 causes the information indicating the bonus consideration to be sent to the user terminal 82 through the communicating unit 46 to cause the user terminal 82 to present the information to the user 80.

Figure 4:
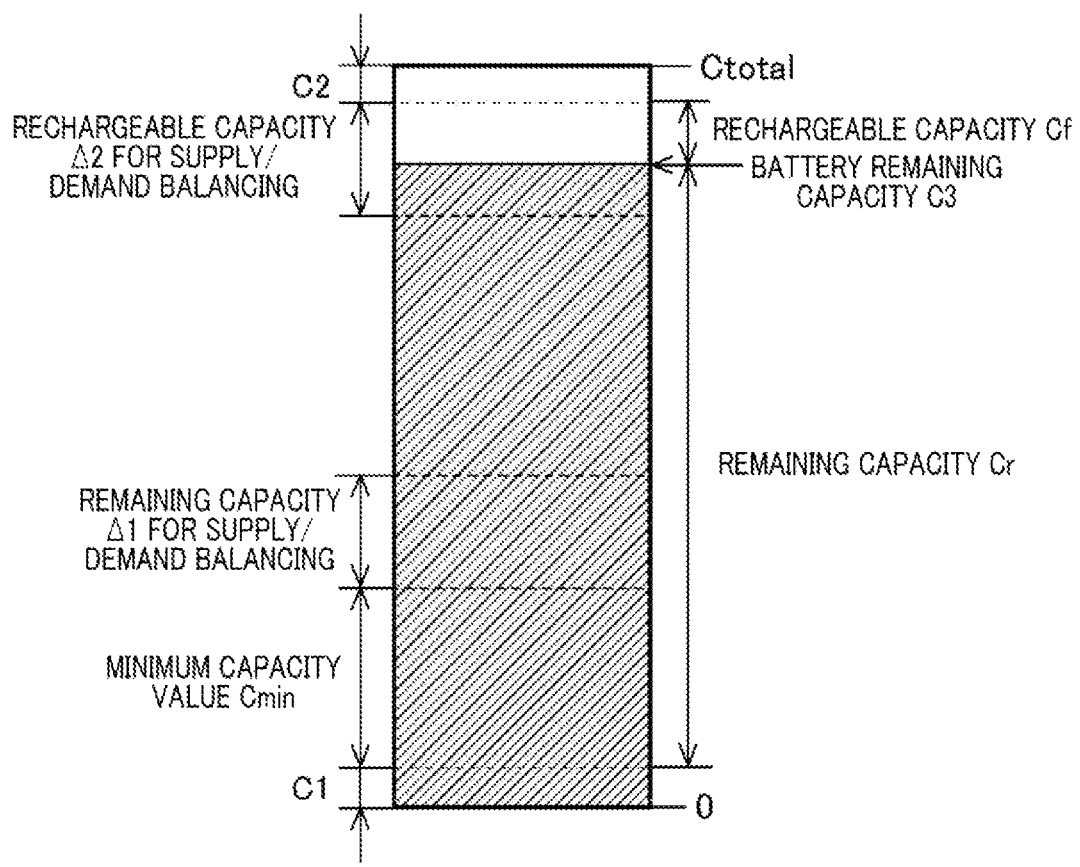
FIG. 4 is a figure schematically illustrating a case where the rechargeable capacity Cf of the battery 32 is lower than a rechargeable capacity value Δ2 for supply/demand balancing.

FIG. 4 is a figure schematically illustrating a case where the rechargeable capacity Cf of the battery 32 is lower than a rechargeable capacity value $\Delta 2$ for supply/demand balancing. If the rechargeable capacity Cf is smaller than the rechargeable capacity value $\Delta 2$, the bonus consideration is 0. That is, if a vehicle 30 provided with a battery 32 having a rechargeable capacity Cf smaller than the rechargeable capacity value $\Delta 2$ is connected to the charge/discharge facility 20, the consideration control unit 270 gives only the basic consideration to the user 80, and does not give bonus consideration to the user 80.

Figure 5:
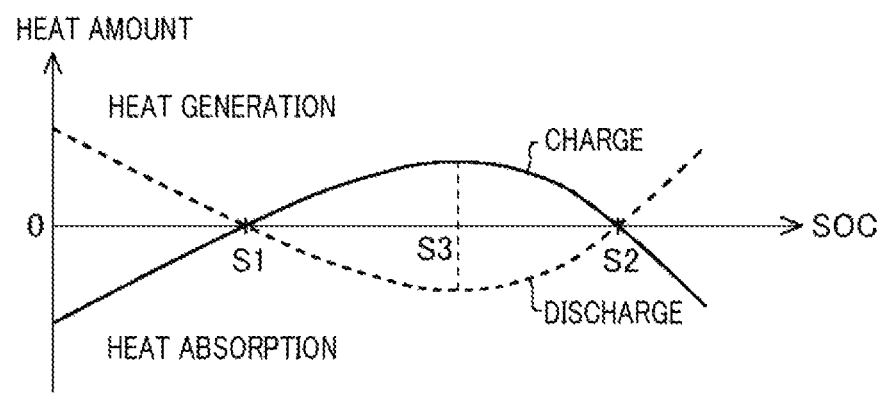
FIG. 5 is a graph illustrating the dependence on the SOC of the reaction heat amount generated at the time of charge, and at the time of discharge of the battery 32.

FIG. 5 is a graph illustrating the dependence on the SOC of the heat amount generated to the battery 32 at the time of charge, and at the time of discharge of the battery 32. The vertical axis in FIG. 5 indicates a generated heat amount. The area where the heat amount is greater than 0 indicates that heat generation occurs, and the area where the heat amount is smaller than 0 indicates that heat absorption occurs. The horizontal axis in FIG. 5 indicates an SOC.

At the time of charge of the battery 32, if the SOC is higher than S2 or the SOC is lower than S1, an endothermic reaction occurs, and if the SOC is higher than S1, and lower than S2, an exothermic reaction occurs. The heat generation amount assumes a local maximum when the SOC is S3.

On the other hand, at the time of discharge of the battery 32, if the SOC is higher than S2 or the SOC is lower than S1, an exothermic reaction occurs, and if the SOC is higher than S1, and lower than S2, an endothermic reaction occurs. The heat absorption amount assumes a local maximum when the SOC is S3.

For the battery 32, typically, a temperature range within which the battery 32 is permitted to be charged, and power is permitted to be discharged from the battery 32 is determined. The ECU of the vehicle 30 does not perform charge/discharge of the battery 32 if the temperature of the battery 32 is out of the temperature range.

Accordingly, for example if the battery 32 is charged when the SOC of the battery 32 is between S1 and S2, and the temperature of the battery 32 is close to the upper limit of the temperature range, there is a possibility that the temperature of the battery 32 exceeds the upper limit of the temperature range due to heat generation that occurs accompanying the charge, and the charge of the battery 32 is stopped. In addition, for example if the battery 32 discharges power when the SOC of the battery 32 is between S1 and S2, and the temperature of the battery 32 is close to the lower limit of the temperature range, there is a possibility that the temperature of the battery 32 falls below the lower limit of the temperature range due to heat absorption that occurs accompanying the discharge, and the discharge of the battery 32 is stopped.

Because of this, there is a possibility that it becomes impossible to perform power transfer between the battery 32 and the power network 10 depending on the SOC of the battery 32, and the temperature of the battery 32. Because of this, the selecting unit 200 desirably selects the vehicle 30 that should be caused to perform power transfer with the power network 10 taking further into consideration the SOC of the battery 32, and the temperature of the battery 32.

Figure 6:
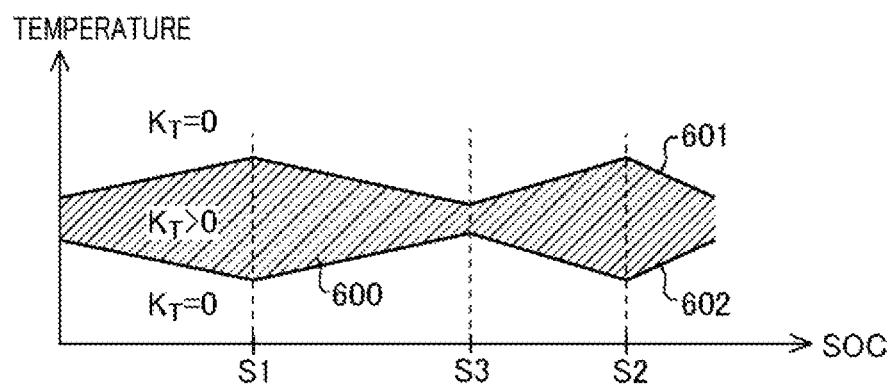
FIG. 6 is a graph indicating conditions for identifying a battery 32 available for charge/discharge.

FIG. 6 is a graph indicating conditions for identifying a battery 32 available for charge/discharge. In FIG. 6, the vertical axis indicates a battery temperature, and the horizontal axis illustrates the SOC of a battery.

A region 600 indicates conditions that are met by a battery 32 available for charge/discharge. The selecting unit 200 identifies, as a battery 32 available for charge/discharge, a battery 32 having a battery temperature, and SOC which are within the region 600.

The region 600 is a region between a line 601 and a line 602. The line 601 assumes local maxima at S1, and S2, and assumes a local minimum at S3. The line 602 assumes local minima at S1, and S2, and assumes a local maximum at S3. The temperature indicated by the line 601 is higher than the temperature indicated by the line 602 no matter what the SOC is. The line 601, and line 602 are determined in advance taking into consideration heat generation and heat absorption that accompany charge/discharge explained with reference to FIG. 5 such that the temperature of the battery 32 stays in the temperature range within which the battery 32 can be charged or caused to discharge power, even if any of charge and discharge of the battery 32 is performed.

The selecting unit 200 prioritizes selection of a vehicle 30 provided with a battery 32 whose battery temperature and SOC are in the region 600 over selection of vehicles 30 whose battery temperatures and SOCs are not within the region 600. For example, the selecting unit 200 selects, as a vehicle 30 that should be caused to perform power transfer with the power network 10, a vehicle 30 provided with a battery 32 whose battery temperature and SOC are in the region 600, and does not select, as a vehicle 30 that should be caused to perform power transfer with the power network 10, vehicles 30 provided with batteries 32 whose battery temperatures and SOCs are outside the region 600.

Specifically, the selecting unit 200 prioritizes selection, as a vehicle that should be caused to perform power transfer with the power network 10, a vehicle 30 provided with a battery 32 whose current battery temperature is lower than a temperature determined based on the current SOC, and line 601, and whose current battery temperature is higher than a temperature determined based on the current SOC, and line 602.

In addition, the coefficient KT is greater than 0 in the region 600, and the coefficient KT is set to 0 in regions outside the region 600. As explained with reference to FIG. 3, the consideration control unit 270 gives a bonus consideration determined based on K0, Cr and Cf, and the coefficient KT to the user 80 of the vehicle 30 selected by the selecting unit 200.

Thereby, a bonus consideration can be given to the user 80 of the vehicle 30 provided with the battery 32 whose battery temperature is within a temperature range that allows charge/discharge. Because of this, for example, selection of a vehicle 30 having an SOC that makes it possible to provide power supply/demand balancing power, and can surely perform charge/discharge can be prioritized, and a consideration can be given to the user of the vehicle 30.

Note that temperature changes of the battery 32 at the time of charge/discharge depend also on the ambient temperature. Because of this, the conditions indicated by the region 600 illustrated in FIG. 6 that are determined may vary depending on the ambient temperature. Based on the temperature, and SOC of the battery 32, the selecting unit 200 may select, as a vehicle that should be caused to perform power transfer with the power network 10, a vehicle 30 that satisfies conditions corresponding to the current ambient temperature around the vehicle 30.

Note that thermal characteristics of a battery illustrated in FIG. 5 depend the type of battery cells constituting the battery 32. Because of this, the conditions illustrated in FIG. 6 may be determined for each type of batteries 32.

FIG. 7 illustrates, in a table format, one example of history information stored in the history storage unit 284. The history information associates a vehicle ID, a time, a battery SOC, a battery temperature, a vehicle position, and a vehicle state with each other.

As the vehicle ID, identification information of the vehicle 30 is stored. As the time, information indicating the time or period at which or during which a history is acquired is stored. As the battery SOC, information indicating the SOC of the battery 32 is stored. As the battery temperature, information indicating the temperature of the battery 32 is stored. As the vehicle position, information indicating the position of the vehicle 30 is stored. As the positional information, other than geographic information such as latitude/longitude information, any information that allows identification of the position of the vehicle 30 such as identification information of the charge/discharge facility 20 to which the vehicle 30 is connected or information indicating whether or not the vehicle 30 is at home can be applied. As the vehicle state, information indicating the state of the vehicle 30 is stored. The state of the vehicle 30 may be "stopped", "started travelling", "travelling", "started charging", "charging", "ended charging", and the like. The managing server 40 may successively receive, from the ECU of the vehicle 30, vehicle data acquired at the ECU of the vehicle 30 to generate the history information based on the received vehicle data.

Note that the capacity presentation control unit 250 may decide the recommended value of the minimum capacity value Cmin of each vehicle 30 based on the history information. For example, the capacity presentation control unit 250 may refer to the history information to identify a repeated travelling pattern of the vehicle 30, and decide the minimum capacity value Cmin based on an amount of power consumed when the vehicle 30 travels following the identified travelling pattern. The capacity presentation control unit 250 may send information indicating the decided minimum capacity value Cmin to the user terminal 82 through the communicating unit 46.

Figure 8:
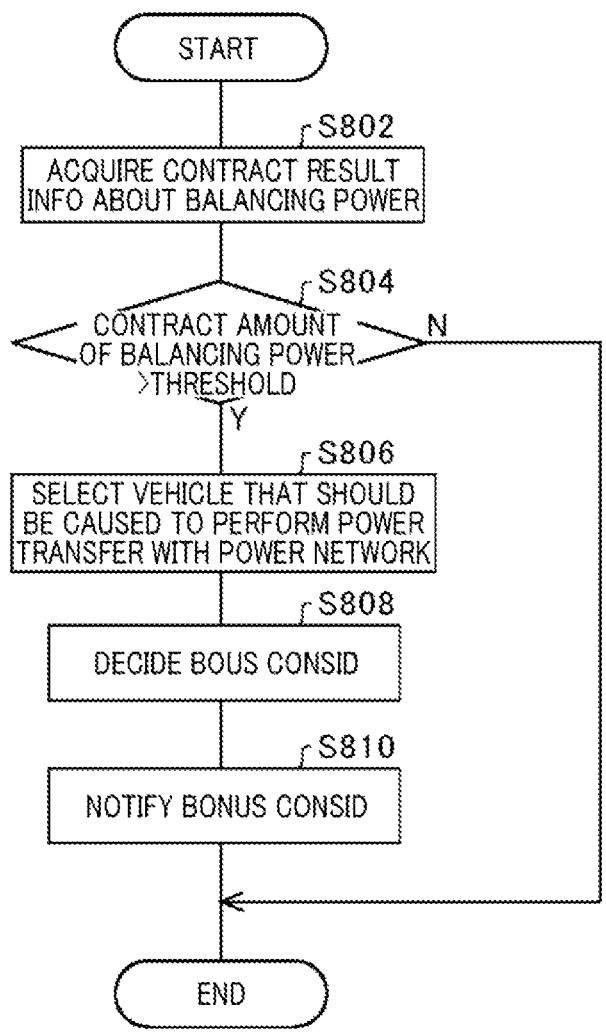
FIG. 8 is a flowchart related to processes of selecting a vehicle 30 that should be caused to perform power transfer with a power network 10.

FIG. 8 is a flowchart related to processes of selecting a vehicle 30 that should be caused to perform power transfer with a power network 10. The processes in the flowchart of FIG. 8 are executed mainly at the processing unit 42 of the managing server 40. The processes in this flowchart may be executed periodically by the managing server 40, for example. For example, the processes in this flowchart may be executed every 30 minutes. For example, the processes in this flowchart may be executed for each 30-minutes time segment, which is the unit of bidding in power transactions, at a time point which is N hours before the start time of each time segment.

At S802, the demand information acquiring unit 290 acquires contract result information about balancing power. For example, the demand information acquiring unit 290 acquires contract result information about balancing power in a 30-minutes time segment which is N hours after the current time.

At S804, the selecting unit 200 determines whether or not the balancing power contract amount exceeds a predetermined threshold. Note that the balancing power contract amount is one example of information indicating the magnitude of the balancing power provided by a vehicle 30. If the balancing power contract amount exceeds the predetermined threshold, at S806, the selecting unit 200 selects a vehicle 30 that should be caused to perform power transfer with the power network 10. For example, as explained with reference to FIG. 3 to FIG. 6, the selecting unit 200 selects a vehicle 30 based on: the SOC, and temperature of a battery 32; the remaining capacity value Δ1 for supply/demand balancing; the rechargeable capacity value Δ2 for supply/demand balancing; the minimum capacity value Cmin; and the like.

At S808, for each of vehicles 30 selected at S806, a bonus consideration for connection to the charge/discharge facility 20 is calculated. As explained with reference to FIG. 3 to FIG. 6, for example, the consideration control unit 270 decides the bonus consideration based on K0, KT, the remaining capacity Cr, and remaining capacity value Δ1, and the rechargeable capacity Cf.

At S810, the consideration control unit 270 causes bonus consideration information indicating the bonus consideration decided at S808 to be sent to the user terminal 82 to thereby notify the user 80 of the bonus consideration, and the processes in this flowchart are ended. Note that if the balancing power contract amount is determined to be equal to or lower than the predetermined threshold in the determination at S804, the processes in this flowchart are ended.

Figure 9:
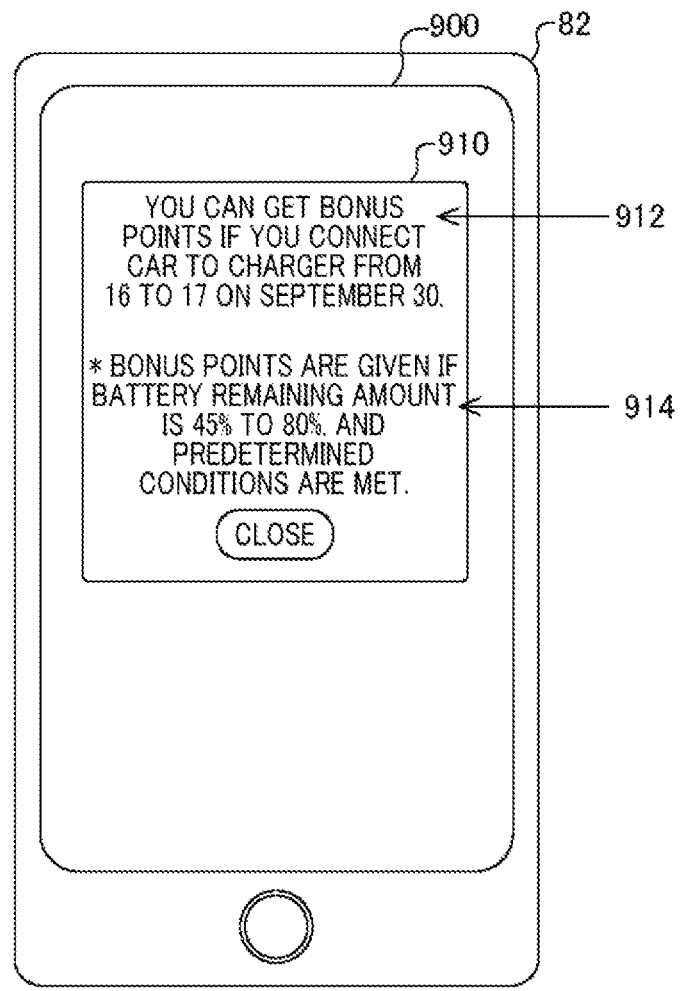
FIG. 9 illustrates one example of a notification screen 900 that notifies a bonus consideration.

FIG. 9 illustrates one example of a notification screen 900 that notifies a bonus consideration. In response to reception by the user terminal 82 of the bonus consideration information from the managing server 40, the notification screen 900 is displayed on the user terminal 82. The notification screen 900 includes a notification object 910. The notification object 910 includes information 912 indicating a period during which a bonus consideration is given, and information 914 indicating the range of battery levels for which the bonus consideration is given.

Since the notification screen 900 makes it possible to notify in advance the user 80 of the period during which the bonus consideration is given, it is possible to prompt the user 80 to connect the vehicle 30 to the charge/discharge facility 20. In addition, since it is possible to notify the user 80 of the range of battery levels for which the bonus consideration is given, it is possible to prompt the user 80 to connect the vehicle 30 to the charge/discharge facility 20 in a state where the remaining amount of the battery 32 is within the range.

Figure 10:
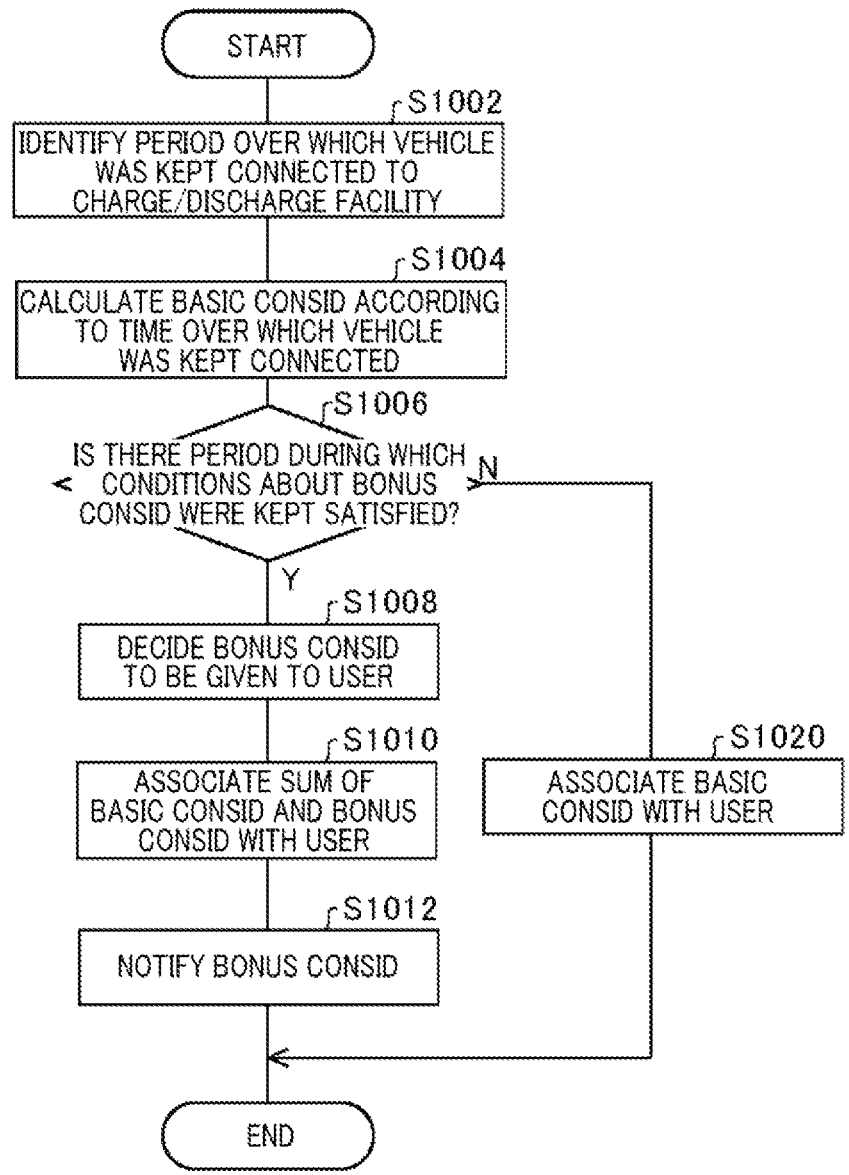
FIG. 10 is a flowchart related to processes of notifying a consideration for the fact that a connection was established with a charge/discharge facility 20.

FIG. 10 is a flowchart related to processes of notifying a consideration for the fact that the vehicle 30 has been connected to the charge/discharge facility 20. The processes in the flowchart of FIG. 10 are executed mainly at the processing unit 42 of the managing server 40. The processes in this flowchart may be executed periodically by the managing server 40, for example. For example, the processes in this flowchart are executed every day for each vehicle 30.

At S1002, the consideration control unit 270 identifies a period over which the vehicle 30 was kept connected to the charge/discharge facility 20. Based on the history information illustrated in FIG. 7 or the like, the consideration control unit 270 identifies a period during which the vehicle 30 was kept connected to the charge/discharge facility 20. At S1004, the consideration control unit 270 calculates a basic consideration according to the length of time over which the vehicle 30 was kept connected to the charge/discharge facility 20. The consideration control unit 270 calculates a basic consideration according to the length of the period over which the vehicle 30 was kept connected to the charge/discharge facility 20.

At S1006, the consideration control unit 270 determines whether or not there is a partial period: which is included in the period over which the vehicle 30 was kept connected to the charge/discharge facility 20; and during which the state of the battery 32 kept satisfying the conditions that should be satisfied in order to be given a bonus consideration. For example, the consideration control unit 270 determines whether or not there is a partial period: which is included in the period over which the vehicle 30 was kept connected to the charge/discharge facility 20; and during which the SOC, and temperature of the battery 32 at the start time of each period is in the region 600 illustrated in FIG. 6.

If it is determined in the determination at S1006 that there is a period over which the state of the battery 32 kept satisfying the conditions that should be satisfied in order to be given a bonus consideration, at S1008, the consideration control unit 270 decides a bonus consideration to be given to the user 80. As explained with reference to FIG. 3 to FIG. 6, and the like, for example, the consideration control unit 270 decides the bonus consideration based on K0, KT, the remaining capacity Cr, and remaining capacity value Δ1, and the rechargeable capacity Cf.

At S1010, the consideration control unit 270 stores, in the consideration information storage unit 282, consideration information indicating the sum of the basic consideration and the bonus consideration decided at S1008, in association with the identification information of the user 80. In addition, at S1012, the consideration control unit 270 causes bonus consideration grant information indicating the bonus consideration to be sent to the user terminal 82 to thereby notify the user 80 of the bonus consideration, and the processes in this flowchart are ended.

Note that if it is determined in the determination at S1006 that there are no periods during which the state of the battery 32 kept satisfying the conditions that should be satisfied in order to be give a bonus consideration, at S1020, the consideration control unit 270 stores, in the consideration information storage unit 282, consideration information indicating the basic consideration in association with the identification information of the user 80, and the processes in this flowchart are ended.

Figure 11:
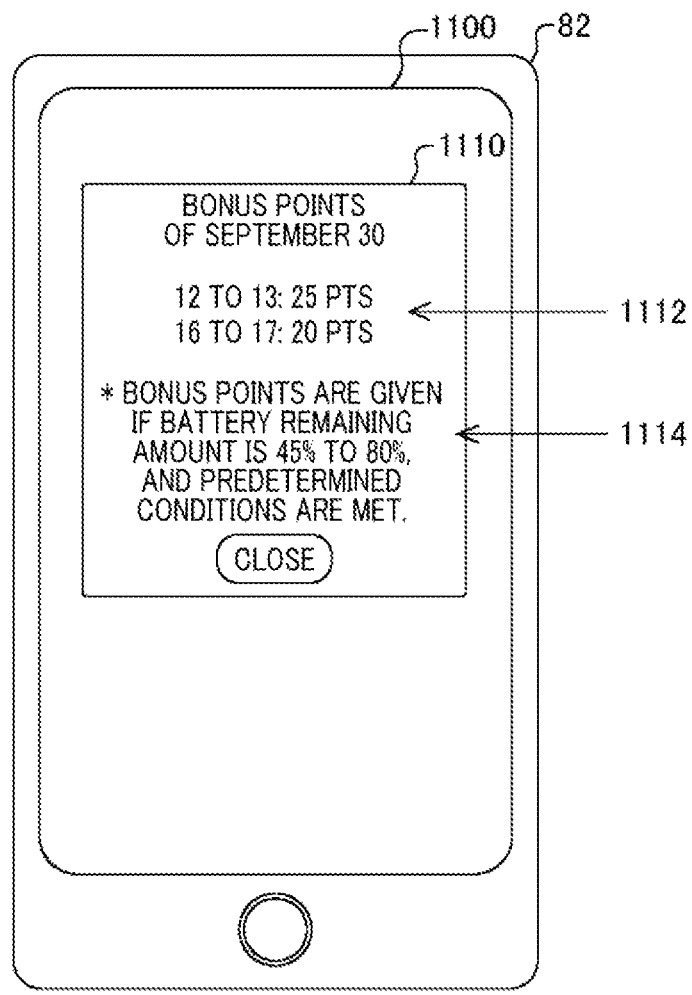
FIG. 11 illustrates one example of a notification screen 1100 that notifies a bonus consideration given to a user 80.

FIG. 11 illustrates one example of a notification screen 1100 that notifies a bonus consideration given to the user 80. In response to reception by the user terminal 82 of the bonus consideration grant information from the managing server 40, the notification screen 1100 is displayed on the user terminal 82. The notification screen 1100 includes a notification object 1110. The notification object 1110 includes:

information 1112 indicating a bonus consideration given to the user 80; and information 1114 indicating the SOC range for which the bonus consideration is given.

Since the notification screen 1100 makes it possible to notify the user 80 that the bonus consideration was given, it is possible to prompt the user 80 to always connect the vehicle 30 to the charge/discharge facility 20. In addition, since it is possible to notify the user 80 of the range of battery levels for which the bonus consideration is given, it is possible to prompt the user 80 to connect the vehicle 30 to the charge/discharge facility 20 in a state where the remaining amount of the battery 32 is within the range.

FIG. 12 illustrates, in a table format, one example of consideration information stored in the consideration information storage unit 282. The consideration information associates a user ID, current points, and total points with each other.

As the user ID, identification information of the user 80 is stored. As the current points, information indicating the current points having been provided to the user 80 is stored. As the total points, the total value of points having been provided to the user 80 until the current time are stored. As the total points, the total value of the points having been provided to the user 80 in a period from a time point which is a predetermined length of time before and until the current time is stored.

The total points can be used as an expected value of connection of the vehicle 30 to the charge/discharge facility 20 by the user 80 in a scheduled period. The consideration control unit 270 may prioritize granting of a consideration such as a voucher for the commercial facility 150 or the like to a user 80 with more total points. The current points having been provided to the user 80 may be usable for payment for a commodity at the commercial facility 150. In addition, the consideration control unit 270 may set a buying unit price to be applied when power is bought from the battery 32 of the vehicle 30, and a selling unit price to be applied when power is sold to the vehicle 30, according to the total points. For example, the consideration control unit 270 may increase the buying unit price, and lower the selling unit price as the total points increase.

Note that, in the power transfer system 100, the user 80 can use the points having been provided to the user 80 for charging the vehicle 30 with the stationary battery 14 at the time of emergency or at the time of disaster. For example, if the current points of the user 80 are equal to or more than a predetermined value, and the remaining capacity of the battery 32 of the vehicle 30 of the user 80 is lower than a predetermined value, the processing unit 42 of the managing server 40 permits charge of the battery 32 with the stationary battery 14, in exchange for subtraction of predetermined points from the current points provided to the user 80.

Note that in the present embodiment explained, points are given to the user 80 as one example of considerations. The consideration is not limited to points. For example, considerations that can be applied are a discount of the usage fee of the charge/discharge facility 20, a discount of the usage fee of a parking lot of the commercial facility 150, a discount of the purchase price of a commodity at the commercial facility 150, and the like. Anything can be applied to a consideration, whether it is a monetary one or non-monetary one, as long as it represents a value or gives an incentive to the user 80.

With the power transfer system 100 explained above, it is possible to prompt the vehicle 30 provided with the battery 32 available for charge/discharge to be connected to the power network 10 according to variations of power demand. Because of this, the power aggregator can reduce the number of vehicles 30 to be management targets for keeping a power transfer capacity for power transfer with the power network 10. Since it becomes easier for the power aggregator to keep a power transfer capacity thereby, this contributes to stabilization of the power network 10.

Figure 13:
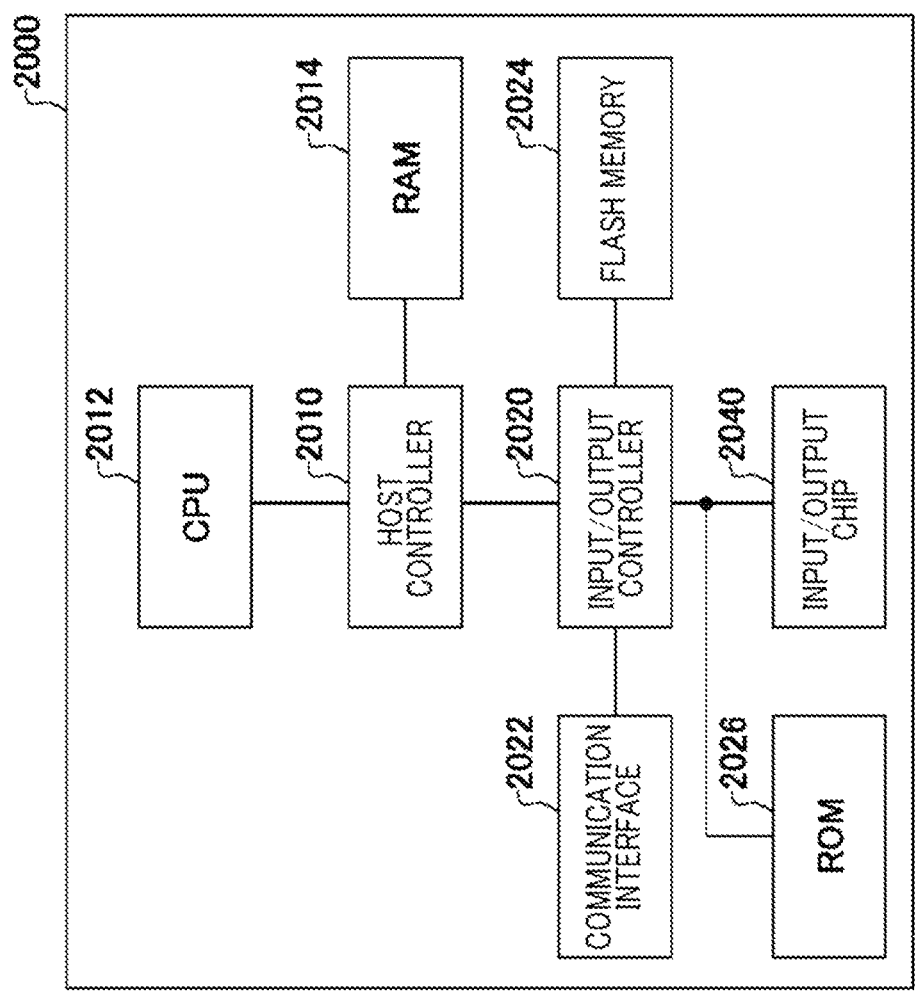
FIG. 13 shows an example of a computer 2000 in which embodiments of the present invention may be wholly or partly embodied.

FIG. 13 shows an example of a computer 2000 in which embodiments of the present invention may be wholly or partly embodied. A program that is installed in the computer 2000 can cause the computer 2000 to function as or perform operations associated with apparatuses such as the managing server 40 of the embodiments or sections thereof, and/or cause the computer 2000 to perform processes of the embodiments of the present invention or steps thereof. Such a program may be executed by the CPU 2012 to cause the computer 2000 to perform certain operations associated with some or all of the blocks of flowcharts and block diagrams described herein.

The computer 2000 according to the present embodiment includes a CPU 2012, and a RAM 2014, which are mutually connected by a host controller 2010. The computer 2000 also includes a ROM 2026, a flash memory 2024, a communication interface 2022, and an input/output chip 2040. The ROM 2026, the flash memory 2024, the communication interface 2022, and the input/output chip 2040 are connected to the host controller 2010 via the input/output controller 2020.

The CPU 2012 operates according to programs stored in the ROM 2026 and the RAM 2014, thereby controlling each unit.

The communication interface 2022 communicates with other electronic devices via a network. The flash memory 2024 stores programs and data used by the CPU 2012 within the computer 2000. The ROM 2026 stores therein a boot program or the like executed by the computer 2000 at the time of activation, and/or a program depending on the hardware of the computer 2000. The input/output chip 2040 may also connect various input/output units such as a keyboard, a mouse and a monitor to the input/output controller 2020 via an input/output port such as a serial port, a parallel port, a keyboard port, a mouse port, a monitor port, a USB port, an HDMI (registered trademark) port and the like.

A program is provided via a computer-readable medium such as a CD-ROM, a DVD-ROM, or a memory card or a network. The RAM 2014, the ROM 2026, or the flash memory 2024 is an example of the computer-readable medium. The program is installed in the flash memory 2024, the RAM 2014, or the ROM 2026, and is executed by the CPU 2012. The information processing described in these programs is read into the computer 2000, resulting in cooperation between a program and the above-mentioned various types of hardware resources. An apparatus or method may be constituted by realizing the operation or processing of information in accordance with the usage of the computer 2000.

For example, when communication is performed between the computer 2000 and an external device, the CPU 2012 may execute a communication program loaded onto the RAM 2014 to instruct communication processing to the communication interface 2022, based on the processing described in the communication program. The communication interface 2022, under control of the CPU 2012, reads transmission data stored on a transmission buffering region provided in a recording medium such as the RAM 2014, the hard disk drive 2024, the DVD-ROM 2001, or the IC card, and transmits the read transmission data to a network or writes reception data received from a network to a reception buffering region or the like provided on the recording medium.

In addition, the CPU 2012 may cause all or a necessary portion of a file or a database to be read into the RAM 2014, the file or the database having been stored in an external recording medium such as the flash memory 2024, and perform various types of processing on the data on the RAM 2014. The CPU 2012 may then write back the processed data to the external recording medium.

Various types of information, such as various types of programs, data, tables, and databases, may be stored in the recording medium to undergo information processing. The CPU 2012 may perform various types of processing on the data read from the RAM 2014, which includes various types of operations, processing of information, condition judging, conditional branch, unconditional branch, search/replace of information, etc., as described throughout this disclosure and designated by an instruction sequence of programs, and writes the result back to the RAM 2014. In addition, the CPU 2012 may search for information in a file, a database, etc., in the recording medium. For example, when a plurality of entries, each having an attribute value of a first attribute associated with an attribute value of a second attribute, are stored in the recording medium, the CPU 2012 may search for an entry matching the condition whose attribute value of the first attribute is designated, from among the plurality of entries, and read the attribute value of the second attribute stored in the entry, thereby obtaining the attribute value of the second attribute associated with the first attribute satisfying the predetermined condition.

The program or software module explained above may be stored on the computer 2000 or a computer-readable medium located near the computer 2000. A recording medium like a hard disk or a RAM provided in a server system connected to a dedicated communication network or the Internet can be used as such a computer-readable medium. The program stored on the computer-readable medium may be provided to the computer 2000 via a network.

The programs that are installed on the computer 2000, and make the computer 2000 function as the managing server 40 may act on the CPU 2012 or the like to make the computer 2000 function as each unit of the managing server 40. Information processing described in these programs are read in by the computer 2000 to thereby make the computer 2000 function as the selecting unit 200, notification control unit 230, capacity information acquiring unit 240, capacity presentation control unit 250, consideration control unit 270, power transfer control unit 280, demand information acquiring unit 290, consideration information storage unit 282, and history storage unit 284, which are specific means attained by cooperation between software and various types of hardware resources mentioned above. With these specific means, the unique managing server 40 corresponding to a purpose of use of the computer 2000 in the present embodiment can be constructed by realizing operations on or processing of information corresponding to the purpose of use.

Various embodiments of the present invention may be described with reference to block diagrams and the like whose blocks may represent (1) steps of processes in which operations are performed or (2) sections of apparatuses responsible for performing operations. Certain steps and sections may be implemented by dedicated circuitry, programmable circuitry supplied with computer-readable instructions stored on computer-readable media, and/or processors supplied with computer-readable instructions stored on computer-readable media. Dedicated circuitry may include digital and/or analog hardware circuits and may include integrated circuits (IC) and/or discrete circuits. Programmable circuitry may include reconfigurable hardware circuits comprising logical AND, OR, XOR, NAND, NOR, and other logical operations, flip-flops, registers, memory elements, etc., such as field-programmable gate arrays (FPGA), programmable logic arrays (PLA), etc.

Computer-readable media may include any tangible device that can store instructions for execution by a suitable device, such that the computer-readable medium having instructions stored therein comprises at least part of an article of manufacture including instructions which can be executed to create means for performing operations specified in the flowcharts or block diagrams. Examples of computer-readable media may include an electronic storage medium, a magnetic storage medium, an optical storage medium, an electromagnetic storage medium, a semiconductor storage medium, etc. More specific examples of computer-readable media may include a floppy disk, a diskette, a hard disk, a random access memory (RAM), a read-only memory (ROM), an erasable programmable read-only memory (EPROM or Flash memory), an electrically erasable programmable read-only memory (EEPROM), a static random access memory (SRAM), a compact disc read-only memory (CD-ROM), a digital versatile disk (DVD), a BLU-RAY (registered trademark) disc, a memory stick, an integrated circuit card, etc.

Computer-readable instructions may include assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, JAVA (registered trademark), C++, etc., and conventional procedural programming languages, such as the "C" programming language or similar programming languages.

Computer-readable instructions may be provided to a processor of a general purpose computer, special purpose computer, or other programmable data processing device, or to programmable circuitry, locally or via a local area network (LAN), wide area network (WAN) such as the Internet, etc., to execute the computer-readable instructions to create means for performing operations specified in the flowcharts or block diagrams. Examples of processors include computer processors, processing units, microprocessors, digital signal processors, controllers, microcontrollers, etc.

While the embodiments of the present invention have been described, the technical scope of the invention is not limited to the above described embodiments. It is apparent to persons skilled in the art that various alterations and improvements can be added to the above-described embodiments. In addition, matters explained about a particular embodiment can be applied to another embodiment as long as such application does not cause technological contradictions. It is also apparent from the scope of the claims that the embodiments added with such alterations or improvements can be included in the technical scope of the invention.

The operations, procedures, steps, and stages of each process performed by an apparatus, system, program, and method shown in the claims, embodiments, or diagrams can be performed in any order as long as the order is not indicated by "prior to," "before," or the like and as long as the output from a previous process is not used in a later process. Even if the process flow is described using phrases such as "first" or "next" in the claims, embodiments, or diagrams, it does not necessarily mean that the process must be performed in this order.

EXPLANATION OF REFERENCE SYMBOLS

10: power network
12: power generation facility
14: stationary battery
20: charge/discharge facility
22: charge/discharge cable
30: vehicle
32: battery
40: managing server
42: processing unit
46: communicating unit
48: storage unit
50: power transaction server
80: user
82: user terminal
100: power transfer system
150: commercial facility
200: selecting unit
230: notification control unit
240: capacity information acquiring unit
250: capacity presentation control unit
270: consideration control unit
280: power transfer control unit
282: consideration information storage unit
284: history storage unit
290: demand information acquiring unit
600: region
601: line
602: line
900: notification screen
910: notification object
912: information
914: information
1100: notification screen
1110: notification object
1112: information
1114: information
2000: computer
2010: host controller
2012: CPU
2014: RAM
2020: input/output controller
2022: communication interface
2024: flash memory
2026: ROM
2040: input/output chip

What is claimed is:

1. A power transfer managing apparatus comprising:
a demand information acquiring unit that acquires information indicating power demand in a power network;
a selecting unit that selects, according to the power demand, as a target vehicle to be caused to perform power transfer with the power network, a vehicle provided with a driving power source having (i) an accumulated energy amount larger than a predetermined accumulation amount, and (ii) an accumulatable energy amount larger than a predetermined accumulatable amount; and
a notification control unit that makes a user of the vehicle that is selected by the selecting unit notified.

2. The power transfer managing apparatus according to claim 1, wherein
the driving power source is a battery, and
the selecting unit selects, according to the power demand, as the target vehicle to be caused to perform power transfer with the power network, a vehicle provided with a battery having (i) a remaining capacity larger than a predetermined remaining capacity value, and (ii) a rechargeable capacity larger than a predetermined rechargeable capacity value.

3. The power transfer managing apparatus according to claim 2, wherein
the information indicating the power demand is information indicating demand for balancing power in the power network, and
if the demand for balancing power is higher than a predetermined value, the selecting unit prioritizes selection, as the target vehicle to be caused to perform power transfer with the power network, of a vehicle provided with a battery having (i) a remaining capacity larger than a predetermined remaining capacity value, and (ii) a rechargeable capacity larger than a predetermined rechargeable capacity value over selection of other vehicles.

4. The power transfer managing apparatus according to claim 2, wherein the notification control unit makes the user of the vehicle that is selected by the selecting unit notified of a consideration for a fact that the vehicle is made available for power transfer with the power network.

5. The power transfer managing apparatus according to claim 2, wherein the selecting unit selects, according to the power demand, as the target vehicle to be caused to perform power transfer with the power network, a vehicle provided with a battery having a remaining capacity larger than a predetermined remaining capacity value, (ii) a rechargeable capacity larger than a predetermined rechargeable capacity value, and (iii) a battery temperature which is within a predetermined range.

6. The power transfer managing apparatus according to claim 5, wherein the selecting unit selects, according to the power demand, as the target vehicle to be caused to perform power transfer with the power network, a vehicle provided with a battery having (i) a remaining capacity larger than a predetermined remaining capacity value, (ii) a rechargeable capacity larger than a predetermined rechargeable capacity value, and (iii) a battery temperature which is within a predetermined range that is determined based on a battery remaining capacity.

7. The power transfer managing apparatus according to claim 2, further comprising a power transfer control unit that causes a vehicle that is available for power transfer with the power network to perform power transfer with the power network according to the power demand.

8. The power transfer managing apparatus according to claim 7, further comprising a capacity information acquiring unit that acquires, from a user of the vehicle, information indicating a value of minimum capacity that should be kept in a battery provided to the vehicle, wherein
the power transfer control unit causes power transfer to be performed with the power network such that the battery remaining capacity does not fall below the value of minimum capacity.

9. The power transfer managing apparatus according to claim 8, wherein the selecting unit selects, as the target vehicle to be caused to perform power transfer with the power network, a vehicle provided with a battery having (i) a remaining capacity larger than a sum of the predetermined remaining capacity value and the value of minimum capacity, and (ii) a rechargeable capacity larger than a predetermined rechargeable capacity value.

10. The power transfer managing apparatus according to claim 8, further comprising a capacity information presenting unit that presents, to the user, information indicating a recommended value of the value of minimum capacity based on a travel history of the vehicle.

11. The power transfer managing apparatus according to claim 8, further comprising a consideration control unit that increases a consideration in information associated with the user, as the value of minimum capacity acquired from the user decreases.

12. The power transfer managing apparatus according to claim 1, further comprising a consideration control unit that associates information indicating a consideration for a fact that the vehicle has been available for power transfer with the power network, with a user of the vehicle if the vehicle selected by the selecting unit has been available for power transfer with the power network.

13. A non-transitory computer-readable storage medium having stored thereon a program for causing a computer to function as:
- a demand information acquiring unit that acquires information indicating power demand in a power network;
- a selecting unit that selects, according to the power demand, as a target vehicle to be caused to perform power transfer with the power network, a vehicle provided with a driving power source having (i) an accumulated energy amount larger than a predetermined accumulation amount, and (ii) an accumulatable energy amount larger than a predetermined accumulatable amount; and
- a notification control unit that makes a user of the vehicle that is selected by the selecting unit notified.

* * * * *